(12) United States Patent  
Richardson et al.

(10) Patent No.: US 6,855,049 B2  
(45) Date of Patent: Feb. 15, 2005

(54) STOW AWAY COLLAPSIBLE FISH CLEANER

(76) Inventors: Kenny Carl Richardson, 10625 SE. 362ND, Space B11, Boring, OR (US) 97009; Larry Donn Richardson, 3070 SE. 21st St., Gresham, OR (US) 97080-6208

( * ) Notice: Subject to any disclaimer, the term of this patent is extended or adjusted under 35 U.S.C. 154(b) by 0 days.

(21) Appl. No.: 10/627,907

(22) Filed: Jul. 25, 2003

(65) Prior Publication Data

US 2004/0029516 A1 Feb. 12, 2004

Related U.S. Application Data

(60) Provisional application No. 60/401,827, filed on Aug. 7, 2002.

(51) Int. Cl.[7] .............................................. A22C 25/02
(52) U.S. Cl. ..................................................... 452/192
(58) Field of Search ................................ 452/192, 194, 452/198, 102–105

(56) References Cited

U.S. PATENT DOCUMENTS

| | | | | |
|---|---|---|---|---|
| 3,668,739 A | * | 6/1972 | Lewis | 452/194 |
| 4,787,109 A | * | 11/1988 | Bennett et al. | 7/106 |
| 5,098,338 A | * | 3/1992 | Jensen | 452/194 |
| 5,100,366 A | * | 3/1992 | Castens et al. | 452/198 |
| 5,116,279 A | * | 5/1992 | Perry | 452/195 |
| 6,117,004 A | * | 9/2000 | Fure | 452/196 |
| 6,200,212 B1 | * | 3/2001 | Henry et al. | 452/194 |
| 6,254,473 B1 | * | 7/2001 | Shore et al. | 452/194 |
| 6,527,635 B1 | * | 3/2003 | Lundy | 452/105 |
| 6,554,691 B1 | * | 4/2003 | Schauls | 452/194 |

* cited by examiner

*Primary Examiner*—Thomas Price  
(74) *Attorney, Agent, or Firm*—Chernoff, Vilhauer, McClung & Stenzel, LLP; Donald Haslett (57) ABSTRACT

A collapsible fish cleaner in the form of a V-shaped trough or holding tray with integral ends that performs similarly to welded or molded fish cleaners to securely hold fish for cleaning on the outside of a boat. Seven integrally incorporated hinge assemblies allow the device to be folded completely flat without disassembly. The device is made ready by unfolding from the flat storage position to the V-shape. The hinges are an integral part of each of six parts interfacing with each other on seven axes in this design. In the use of the device, a support flange rests on the side gunwale of a boat, secured to the boat by a quick release connector.

6 Claims, 7 Drawing Sheets

STOW AWAY COLLAPSIBLE FISH CLEANER

This application claims the benefit of Provisional application No. 60/401,827, filed Aug. 7, 2002.

BACKGROUND OF THE INVENTION

A void exists in the market for a convenient and storable fish cleaning trough which works as well as others on the market, but when folded flat for storage takes up a minimal amount of room.

SUMMARY OF THE INVENTION

The collapsible fish cleaner is a seven piece aluminum unit with six sides, permanently affixed together by integral hinges and stainless hinge pins, and a support flange. The unit opens into a V-shaped trough with closed ends that allow fish to be placed in the trough without risk of sliding out either end. In one embodiment, a support flange and two strap and hook assemblies affix the unit to the gunwale of a boat. The secured unit allows cleaning a fish over the side of the boat and lets blood and small viscera drain through the hinge assemblies, outside of the boat, by way of the space at each bottom edge of the unit. The space is adequate for drainage, yet is small enough to prevent loss of normal knives and cleaning accessories through the drain notches.

The cleaner presents several advantages over others in the market. The unit folds flat for convenient storage, unlike other units which take up the bulk-space of the open trough dimensions. The unit has integral hinge assemblies which are part of the pieces which form the unit based upon the seven interlocking hinge interfaces, as an alternative to commercially produced hinges welded into the same positions. The drainage slots are configured so they do not allow loss of cleaning utensils such as standard fillet knives, gut spoons, and fish scaling tools. The unit provides a semi-raised position which aids in ease of cleaning the fish, and allows easier unhooking and release of those fish not intended to be kept.

The unit was developed to meet the desire of guides and sport fishermen for maximizing their useable boat space while still maintaining the convenience of being able to clean their catch in a quality apparatus designed to hold and clean fish in the Pacific Northwest. The unit will fill similar needs and desires in areas outside of where it was developed and will apply to much broader scope than for what it was initially developed. Fishermen that keep and clean fish and that are concerned for boat space in many geographic areas will find use for this device.

The collapsible fish cleaner is a V-shaped trough or holding tray with integral ends that performs similarly to welded or molded fish cleaners to securely hold fish for cleaning on the outside of the boat. Seven integrally incorporated hinge assemblies allow the device to be folded completely flat without disassembly. The hinges are an integral part of each of six parts interfacing with each other on seven axes in this design. The device is made ready by unfolding from the flat storage position to the V-shape, with no assembly. In the preferred embodiment, the folded flat dimension is approximately 1.5 inches including the 1 inch support flange. The primary components are made of aluminum with stainless steel hinge pins making it strong and durable. The device rests on the side gunwale of a boat on the support flange, secured to the boat by web strap, a lever type harness clip, or other quick release connector.

DETAILED DESCRIPTION OF THE INVENTION

The present invention relates to a device for holding a fish for cleaning. The drawings submitted show the preferred embodiment.

Figure 1:
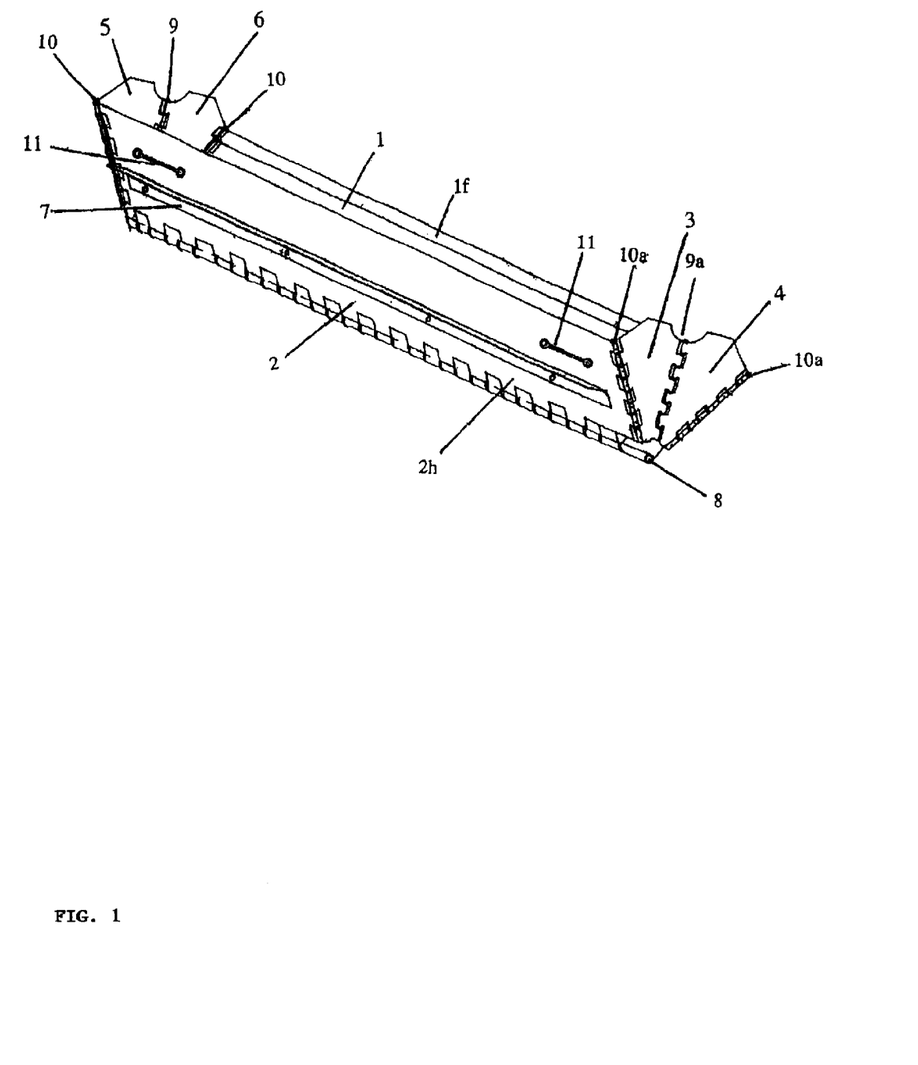
FIG. 1 is a perspective view of an assembled collapsible fish cleaner.
Figure 2:
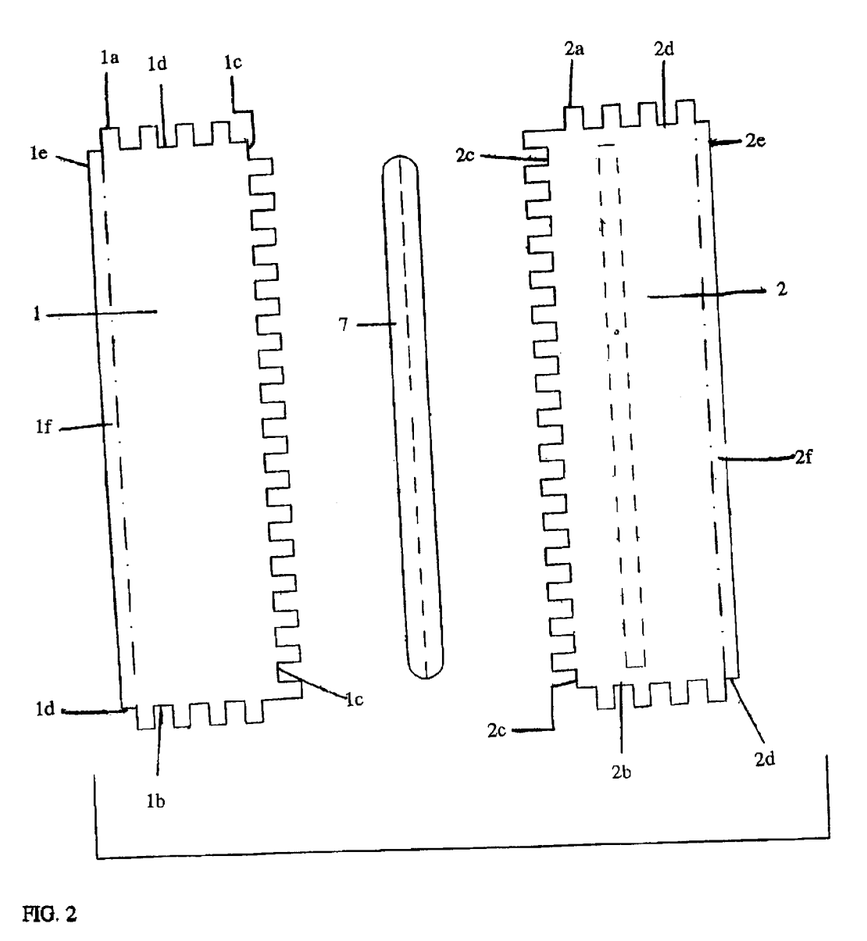
FIG. 2 is the flat pattern layout of the front piece, back piece, and support flange for the fish cleaner shown in FIG. 1.

The front piece 1 has integral hinge tabs 1a and hinge notches 1b on the bottom edge 1c and side edges 1d. The top edge 1e has a hem 1f, which hem is turned inwards towards the inside center of the cleaner. The integral hinge tabs 1a intermesh with a back piece 2. Back piece 2 has integral hinge tabs 2a and hinge notches 2b on its bottom edge 2c and side edges 2d. Said intermeshing occurs at the integral hinge tabs 1a along bottom edge 1c and integral hinge tabs 2a along bottom edge 2c. The top edge 2e has a hem 2f, which is turned inwards towards the inside center of the cleaner.

Figure 3A:
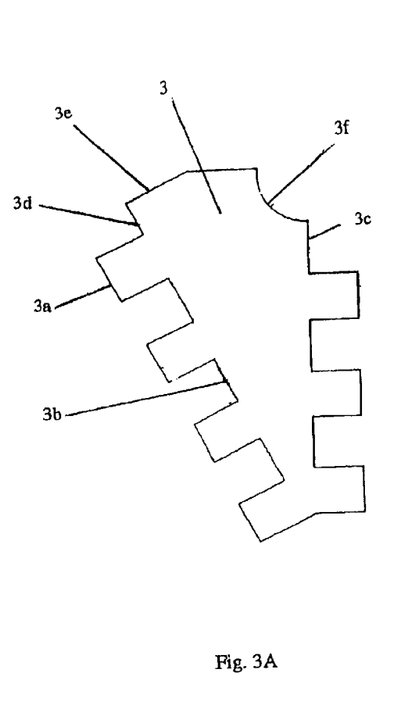
FIGS. 3A and 3B are the flat pattern layouts of two angular end pieces of the fish cleaner.

A first back angular end piece 3 has hinge tabs 3a and hinge notches 3b along an interior edge 3c and exterior edge 3d. Said back angular edge piece meshes with back piece 2 at exterior edge 3d and one of the side edges 2d. A top edge 3e of the first back angular end piece 3 matches the height of the hem 2f at 2e but leaves a space above bottom edge 2c through which fish viscera may be cleared.

The first back angular end piece 3 has a fish holding notch 3f cut out of the corner between top edge 3e and interior edge 3c. Notch 3f, when joined in assembly, may be used to help secure the head or tail of a fish being cleaned.

Figure 4A:
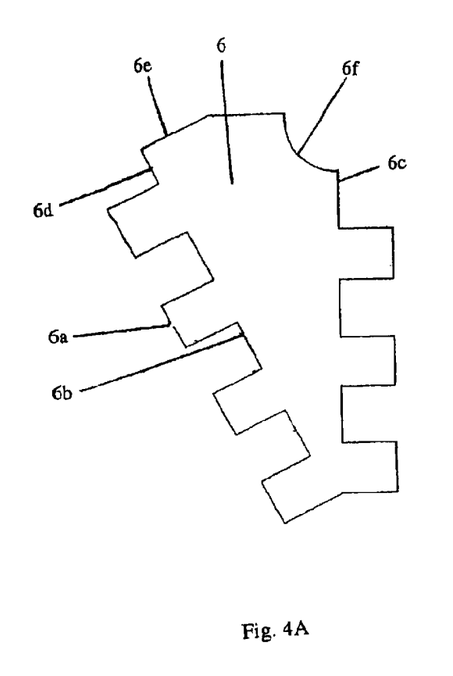
FIGS. 4A and 4B are the flat pattern layouts for two other angular end pieces of the fish cleaner shown in FIG. 1.

A first front angular end piece 4 has hinge tabs 4a and hinge notches 4b along interior edge 4c and exterior edge 4d. Said first front angular piece meshes with front piece 1 at exterior edge 4d and one of the side edges 1d. Further the first front angular edge piece 4 meshes with said first back angular edge piece 3 along interior edge 3c and interior edge 4c. A top edge 4e matches the height of the hem 1f at 1e but a bottom end leaves a space above bottom edge 1c through which fish viscera may be cleared.

Figure 4B:
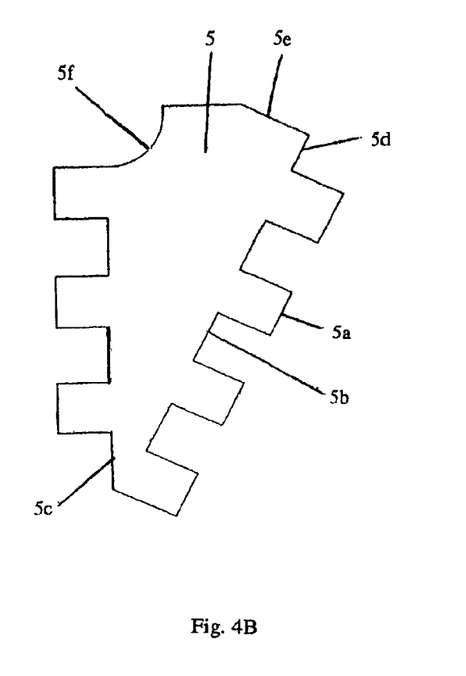

The first front angular end piece 4 has a fish holding notch 4f cut out of the corner between top edge 4e and interior edge 4c. Notch 4f, when joined in assembly, may be used to help secure the head or tail of a fish being cleaned. A second front angular end piece 5 is identical to the first front angular end piece 4 and has hinge tabs 5a and hinge notches 5b along interior edge 5c and exterior edge 5d. Said second front angular piece 5 meshes with front piece 1 at exterior edge 5d and one of the side edges 1d. Further said second front angular edge piece 5 meshes with a second back angular edge piece 6 along interior edge 6c and interior edge 5c. A top edge 5e matches the height of the hem 1f at 1e but leaves a space above bottom edge 1c through which fish viscera may be cleared.

The front angular end piece 5 has a fish holding notch 5f cut out of the corner between top edge 5e and interior edge 5c. Notch 5f, when joined in assembly, may be used to help secure the head or tail of a fish being cleaned.

Figure 3B:
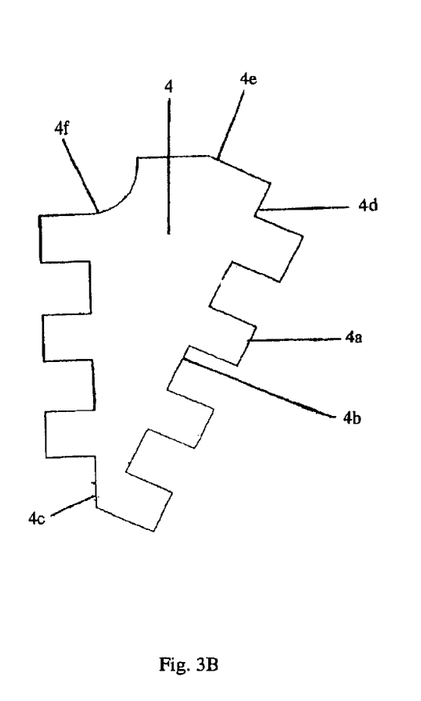

A second back angular end piece 6 is identical to said first back angular end piece 3 and has hinge tabs 6a and hinge notches 6b along an interior edge 6c and exterior edge 6d. Said second back angular edge piece 6 meshes with back piece 2 at exterior edge 6d and one of the side edges 2d. A top edge 6e of the second angular end piece 6 matches the height of the hem 2f at 2e but a bottom end leaves a space above bottom edge 2c through which fish viscera may be cleared. The second back angular end piece 6 has a fish holding notch 6f cut out of the corner between top edge 6e and interior edge 6c. Notch 6f, when joined in assembly, may be used to help secure the head or tail of a fish being cleaned.

A support flange 7 is attached to an exterior surface 2h of said back piece 2.

Figure 6:
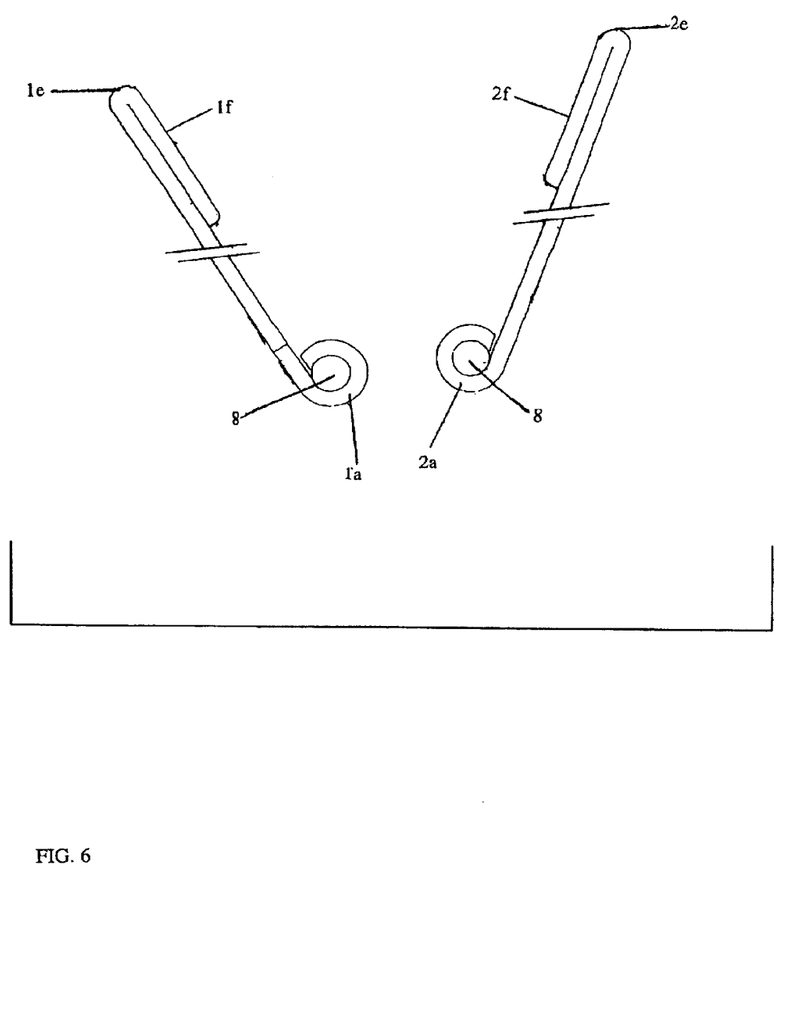
FIG. 6 is an exploded end view of the bottom horizontal hinge assembly joining the front piece and back piece.
Figure 7:
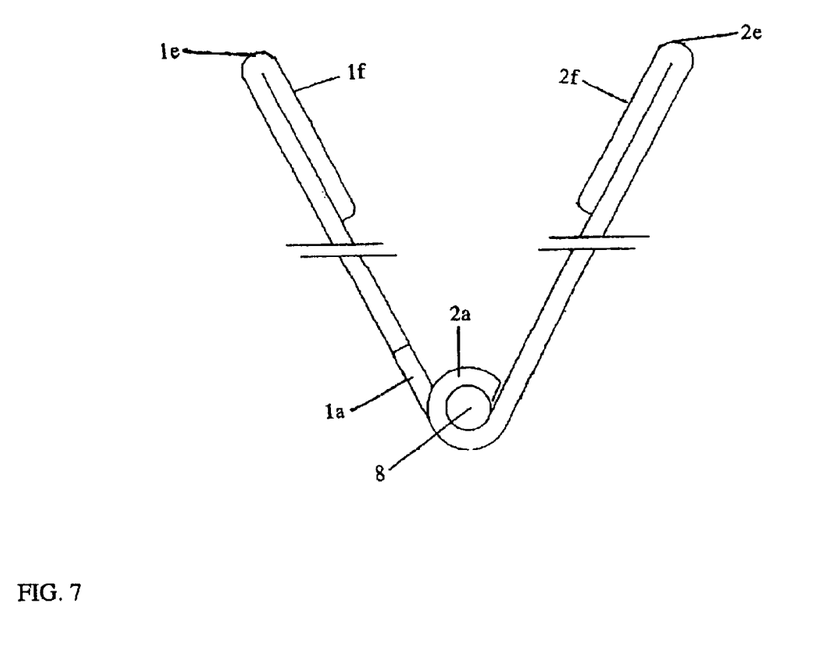
FIG. 7 is an end view of the bottom horizontal hinge assembly joining the front piece and back piece.

A bottom horizontal hinge pin 8 joins the front piece 1 to the back piece 2 along bottom edges 1c and 2c.

Figure 5:
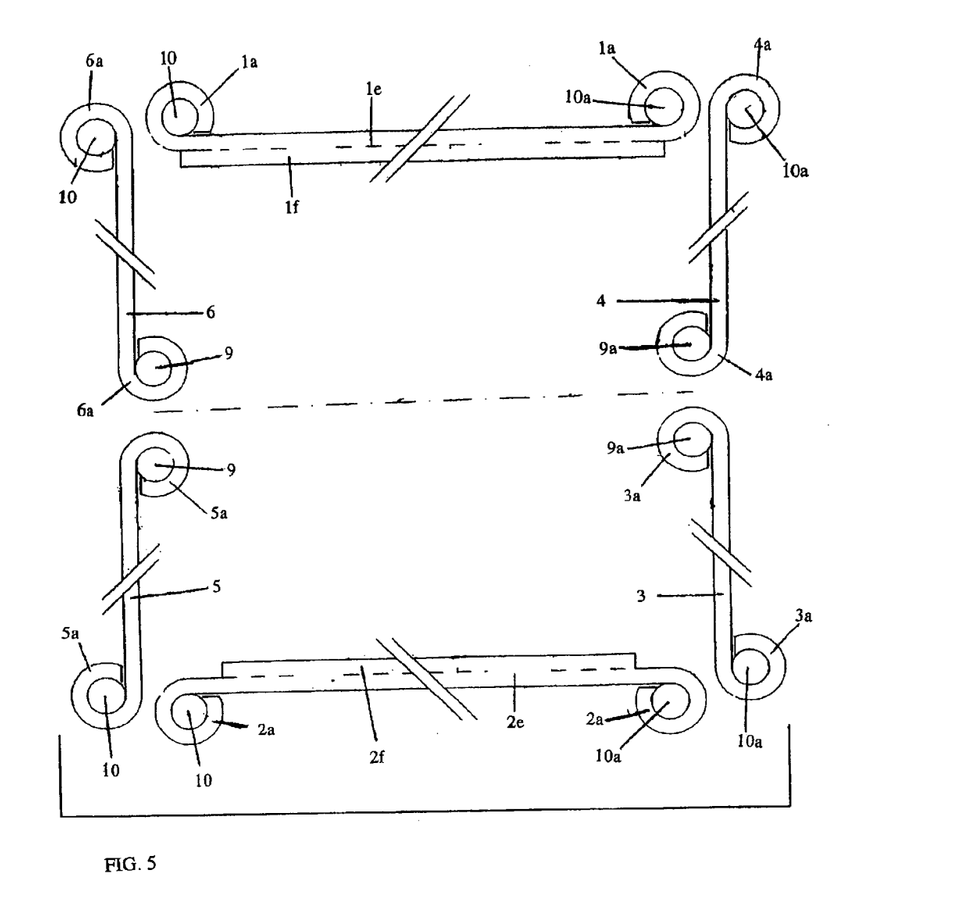
FIG. 5 is an exploded top view of the device, showing the hinges except the bottom horizontal hinge.

A first center vertical hinge pin 9 joins first back angular end piece 3 to first front angular end piece 4 at interior edges 3c and 4d. A second center vertical hinge pin 9a joins second back angular end piece 6 to second front angular end piece 5 along interior edges 6c and 5c.

A first set of corner vertical hinge pins 10 join back piece 2 to back angular end pieces 3 and 5 along exterior edges 3d and 5d respectively. A second set of corner vertical hinge pins 10a join first and second front angular end pieces 4 and 6 to front piece 1 along exterior edges 4d and 6d respectively.

The bottom edges 1c and 2c each have tabs 1a and 2a which are bent to accommodate a bottom hinge pin 8.

Exterior surface 2h has affixed to it a means to attach the apparatus to the gunwale of a boat. In the preferred embodiment, said means is a footman strap loop attachment 11 affixed to exterior surface 2h by ¼ inch stainless steel Phillips head screws and ¼ inch nylon insert lock nuts (not shown).

The means for manufacturing the pieces of said device and forming the hinges are well known.

FIGS. 3A and 3B, and 4A and 4B show the form of the tab and notch interfaces, holes and hem, a front piece, a back piece, and angular end pieces. In the preferred embodiment, 0.080 inch gauge aluminum is used for the front piece, back piece, and support flange, but the maker may utilize other materials to produce a similar device with equivalent alternative materials. Both the front piece 1 and back piece 2 have a bottom hinge interface which interface is an alternating tab and notch pattern cut into the side. In the preferred embodiment, the combined measurement of one notch and one tab is two inches, with 16 alternating tabs and notches. In the alternative, the pattern can be either lengthened or shortened in 2 inch increments without making any significant design changes in the pattern of these two pieces, provided that the corresponding the hinge pin and top hem are lengthened or shortened to match the change in the pattern.

In the preferred embodiment, six planar pieces 1, 2, 3, 4, 5, and 6 are cut by computer-assisted plasma cutter or laser, or by a high quality bandsaw which follows the specified layout of the pattern for the perimeter layout. Holes to secure the support flange and footman strap are either punched or drilled to accommodate ¼ inch diameter hardware in the flat fabrication.

The hinge tabs 1a, 2a, 3a, 4a, 5a and 6a are bent by a commercial fabricator in press equipment to a 135 degree "U" shape by utilizing a 3/16 (or ¼ inch) die. The result is a 3/16 inch "U" shaped hinge radius, ready to be closed with the insertion of the hinge pin and subsequent press application pressure to the leading edge subsequently closing the hinge. Each of the hinge tabs 1a, 2a, 3a, 4a, 5a, and 6a has length which is divided into a first rolled part (not shown) and a second rolled part (not shown). The length of the first rolled part is not critical as long as all hinge tabs are manufactured with lengths identical to each other, so that the interfaces cannot be disassembled without hinge pin removal. An ideal closure of the hinge tabs places the leading tab edge in close contact with itself near the start of the hinge-tab radius bend.

The length of the first rolled part of the tab is determined as follows: the hinge diameter dimension is calculated as the sum of twice the thickness of the material plus the diameter of the forming die. In the preferred embodiment, this calculation is (0.080+0.080+0.1875=0.3475"). The circumference of a circle having a diameter equal to the hinge diameter is calculated. In the preferred embodiment, this circumference equals 1.0917". However the leading edge of the tab contacts itself on closure at 294 degrees of bend, requiring only 81.667% (294/360 degrees) of this circumference measurement. This results in 0.8916" of the tab material being bent. The balance of the tab is left unbent and in the original plane of the whole part to which it is a sub-component. The midpoint of this bent measurement (0.4458°) is the distance from the leading edge to the break point of the 135 degree press bend performed by the fabricator with a press and 3/16 inch die. There is enough tab material that when performing the steps below for hinge closure and the closed hinge cannot be disassembled without manual pin removal. An ideal closure of the hinge places the leading tab edge in close contact with itself near the start of the hinge-tab radius bend as shown in FIG. 7. Alternative technology to achieve a closed hinge is acceptable, but does not represent change to of this invention.

Front piece 1 and front piece 2 are combined at 1c and 2c and the hinge is closed from the 135 degree position to 270 degree closed hinge position with the hinge pin 8 inside the radius.

First back angular end piece 3, and first front angular end piece 4, are combined with hinge pin 9a (FIG. 5), and the hinge is closed from the 135 degree position to the 270 degree closed hinge completion.

Second front angular end piece 5 and second back angular end piece 6 are combined with hinge pin 9 by the same process as with part 9a.

First back angular end piece 3 and back piece 2 are combined with one of a pair of hinge pins 10a and the hinge is closed from the 135 degree position to 270 degree closed hinge position with one hinge pin 10a inside the radius.

Second front angular end piece 5 and back piece 2 are combined with one of a pair of hinge pins 10 and the hinge is closed from the 135 degree position to 270 degree closed hinge position with one hinge pin 10 inside the radius.

Hinge pin 9a at intersection of first back angular end piece 3 and first front angular end piece 4 and pin 9a at the intersection of second front angular end piece 5 and second back angular end piece 6 are removed.

First front angular end piece 4 and front piece 1 are combined with one of a pair of hinge pins 10a and the hinge is closed from the 135 degree position to 270 degree closed hinge position with one hinge pin 10a inside the radius.

Second back angular end piece 6 and front piece 1 are combined with one of a pair of hinge pins 10 and the hinge is closed from the 135 degree position to 270 degree closed hinge position with one hinge pin 10 inside the radius.

Rivets (not shown) are inserted from the inside through back piece 2 and then through support flange 7. Rivets are compressed, pulling together support flange 7 and back piece 2 forming the attachment for support flange. A hydraulic press and W' capping tool is used to form a conical compressed rivet head on the exterior of device and flange. The support flange, at a 120 degree bend angle is flush on back piece 2 and extends away from back piece 2 perpendicular to the centerline of the cleaner in its open and ready to use application.

First back and front angular end pieces 3 and 4 and second front and back angular end pieces 5 and 6 are realigned and hinge pins 9 and 9a are reinstalled. This is best accomplished in a collapsed position.

Two Footman loops 11 are installed in back piece 2, with 4 ea ¼"×½ " stainless steel Phillips head screws and 4 ea ¼" nylon insert lock nuts. Two nylon straps (not shown) secure the fish cleaner to attachment points in or on the boat.

The support flange 7 is riveted to the exterior 2h and extends away from the trough. In the preferred embodiment, the unit extends 5.5 inches above the support flange to provide a user a semi-raised position to aid in cleaning fish or allow easier unhooking and release of fish not intended to be kept.

The resulting completed device can be effectively used in place of other fish cleaning boxes and/or trays yet is of integral one piece assembled design, that can be folded flat for stowage. The folded cleaner is essentially flat when collapsed for stowage and can fit in spaces where other fish cleaning trays troughs or devices might not be stored.

Use of the device is simple and convenient. The collapsible fish cleaner should be secured to the gunwale of a boat by a strap through each of the footman loops, which loops should be adjusted to achieve a convenient placement height. The device should be pulled from its collapsed position to an open position, which will resemble a V-shaped trough. A user can then place a fish either entirely inside the unit, or with the fish's head or tail protruding through the notches described, which will aid in holding the fish during cleaning.

Upon completion of all cleaning details, rinse the device and fold ends out, to achieve a closed position. A user can then remove the strap and place cleaner in a storage area. The cleaner is ready for subsequent use. Modifications in design and variations upon this can obviously be made on this present invention in light of the above teachings. These details in the above description illustrate some preferred embodiments and should not be construed as a limitation on the scope of the invention.

We claim:

1. A collapsible fish cleaner, comprising:
   (a) an elongated trough capable of being opened to a v-shaped configuration to hold a fish to be cleaned and of being closed to a compact planar configuration for storage, said trough including a pair of opposite ends, at least one of said pair of opposite ends having a top defining a fish holding notch; and
   (b) a mounting capable of removably attaching the trough to a gunwale of a boat.

2. The fish cleaner of claim 1, wherein said trough comprises:
   (a) an elongate front piece hingedly attached along a bottom long side of said front piece to an elongate back piece along a bottom long side of said back piece;
   (b) first and second angular front end pieces, each hingedly attached to said front piece along a respective short side of said front piece; and
   (c) first and second angular back end pieces, each of said back end pieces being hingedly attached to said back piece along a respective short side of said back piece, and each of said back end pieces being hingedly attached to a respective one of said first and second front end pieces.

3. The device of claim 2, wherein at least one of said front piece, said back piece, and said end pieces includes a hinge including a plurality of hinge tabs integral therewith.

4. The fish cleaner of claim 1 wherein said trough comprises:
   (a) an elongate front piece foldably attached along a long side of said front piece to an elongate back piece along a long side of said back piece;
   (b) an angular front end piece foldably attached to said front piece along a respective short side of said front piece; and
   (c) an angular back end piece foldably attached to said back piece along a respective short side of said back piece.

5. The fish cleaner of claim 4, further comprising a drain space at the bottom of said trough and immediately below at least one of said end pieces, through which removed fish parts may escape said trough.

6. A collapsible fish cleaner device, comprising:
   (a) an elongate v-shaped trough capable of being opened to hold a fish to be cleaned and closed to a compact generally planar configuration for storage, wherein said trough comprises a planar front piece and a planar back piece, each having a plurality of hinge notches and hinge tabs located along a long side and each of a pair of short sides, said hinge tabs along said long side being bent and retaining a horizontal hinge pin;
   (b) first and second angular front end pieces, each having a plurality of hinge notches and hinge tabs located along two sides thereof, said hinge tabs being bent and retaining one of a pair of front hinge pins or one of a pair of central hinge pins;
   (c) first and second angular back end pieces, each having a plurality of hinge notches and hinge tabs located along two sides thereof, said hinge tabs being bent and retaining one of a pair of back hinge pins or one of said pair of central hinge pins;
   (d) a mounting capable of removably attaching the trough to a gunwale of a boat, said mounting including a support flange secured to an exterior side of said back piece;
   (e) a drain space above an end of said horizontal hinge pin to permit removed fish parts to escape said trough; and
   (f) at least one of said end pieces defining a fish holding notch.

* * * * *